Sept. 24, 1946.  L. O. McLEAN  2,408,327
FLUID PRESSURE CLUTCH MECHANISM
Filed Nov. 17, 1944  4 Sheets-Sheet 1

INVENTOR.
Leland O. McLean,
BY Edward A. Laurence
his attorney.

Sept. 24, 1946.	L. O. McLEAN	2,408,327
FLUID PRESSURE CLUTCH MECHANISM
Filed Nov. 17, 1944	4 Sheets-Sheet 2

Sept. 24, 1946.  L. O. McLEAN  2,408,327
FLUID PRESSURE CLUTCH MECHANISM
Filed Nov. 17, 1944  4 Sheets-Sheet 3

INVENTOR.
Leland O. McLean.
BY
Edward A. Lawrence,
his attorney.

Sept. 24, 1946.  L. O. McLEAN  2,408,327
FLUID PRESSURE CLUTCH MECHANISM
Filed Nov. 17, 1944   4 Sheets-Sheet 4
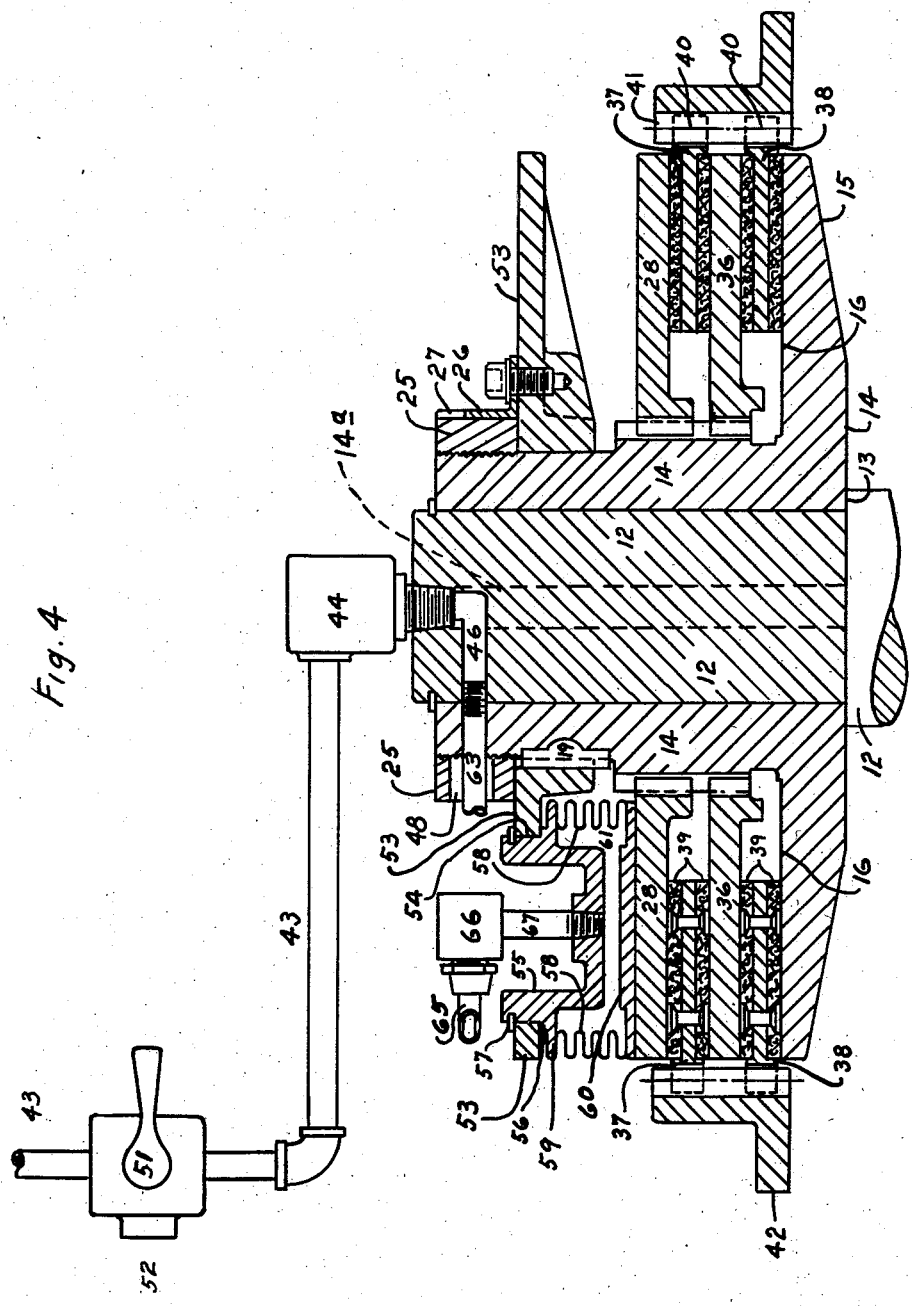

Patented Sept. 24, 1946

2,408,327

UNITED STATES PATENT OFFICE 2,408,327

FLUID PRESSURE CLUTCH MECHANISM

Leland O. McLean, Marion, Ohio, assignor to The Osgood Company, Marion, Ohio, a corporation of Ohio Application November 17, 1944, Serial No. 563,949

8 Claims. (Cl. 192—88)

My invention relates to certain new and useful improvements in transmission clutch mechanism.

Among objects which I have in view are the following.

A simple and durable clutch structure which is inexpensive to manufacture, rigid and durable, and which may be quickly adjusted, as to take up wear on the clutch facings, without requiring disassemblage.

A clutch mechanism operated by fluid pressure which is rapid and positive in operation requires a minimum volume of fluid, such for instance as compressed air.

A clutch mechanism which does not require the provision of helical or other types of tension springs to separate the surfaces, held in frictional engagement, when the clutch is released, the corrugated walls of the pressure chamber promptly separating the engaging elements when the fluid pressure is relieved from the chamber.

A clutch mechanism wherein the rotary force is transmitted directly from the hub of the mechanism to the driving plates without the interposition of intermediate mechanism, making the drive more positive from the driving shaft to the mechanism to be rotated.

A clutch in which the fluid pressure connections to the pressure chamber are protected from accidental injury.

The objects above referred to are successfully accomplished by the invention hereinafter described.

Other advantages will appear from the following description.

In the accompanying drawings, wherein I have illustrated practical embodiments of the principles of my invention, Fig. 1 is an elevation of one form of my improved clutch mechanism, shown mounted on the driving shaft, the shaft being shown in section taken along the dotted line 1—1 in Fig. 2.

Fig. 4 is a cross sectional view taken along the irregular dotted line 4—4 in Fig. 3.

Figure 1:
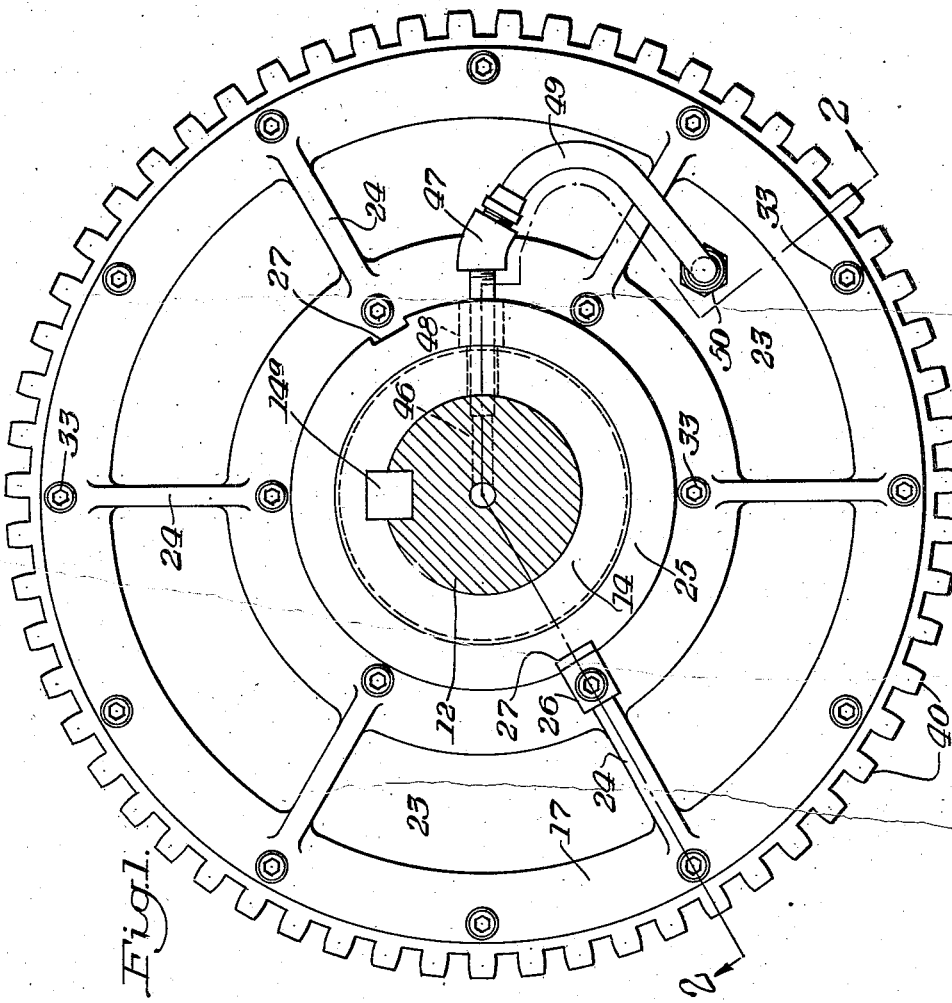
Figure 2:
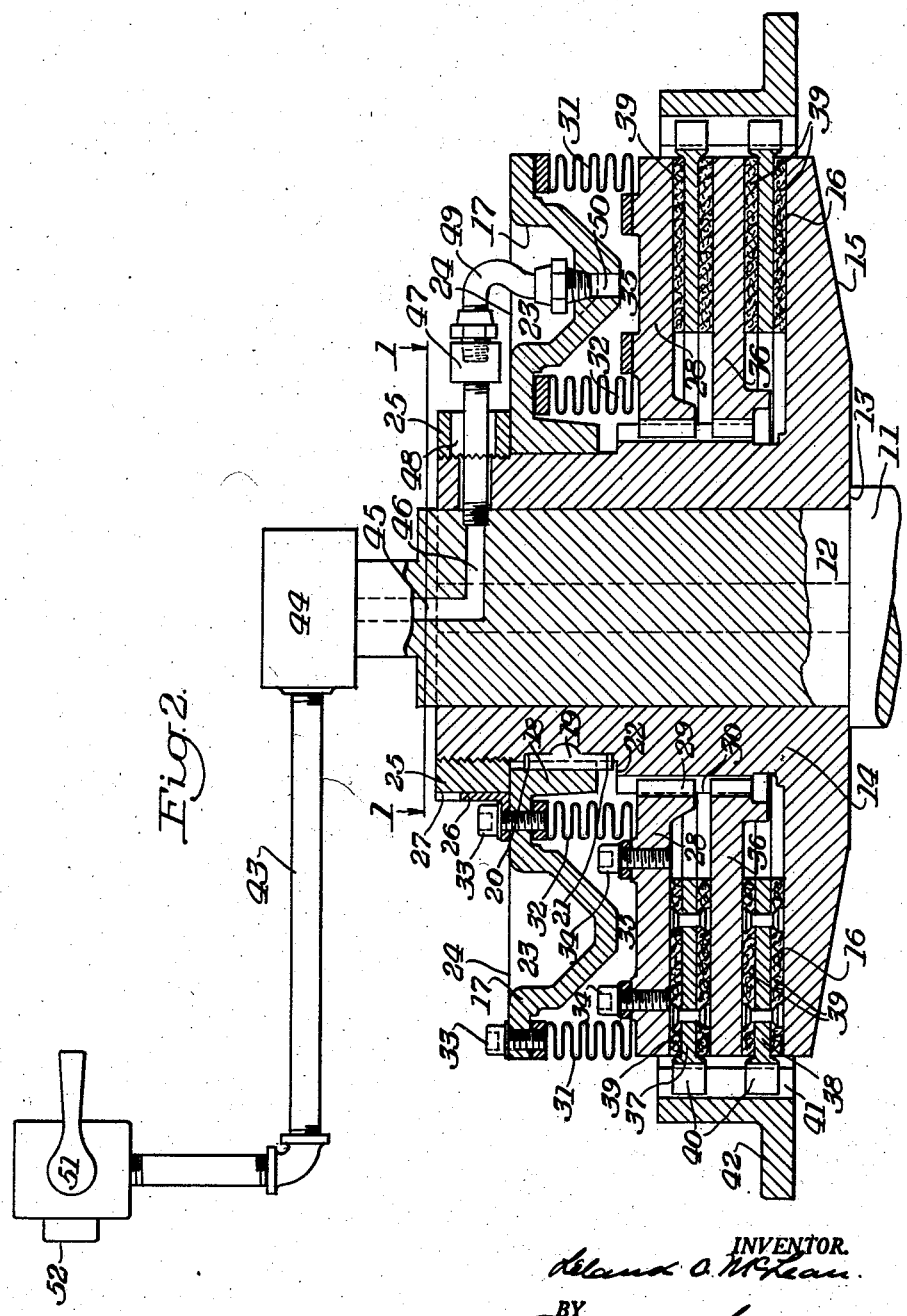
Fig. 2 is a cross sectional view taken along the irregular dotted line 2—2 in Fig. 1, and also showing the fluid pressure connections.

Referring first to Figs. 1 and 2 of the drawings, 11 indicates the driving shaft whose end portion 12 is reduced in diameter providing an annular shoulder 13. A hub 14 is provided with a bore of the proper diameter to be slipped down over the reduced portion 12 and rest against the shoulder 13. The hub is fixed on the shaft to rotate therewith by means of a key 14a driven into registering seats in the hub and the shaft, as indicated in Fig. 1.

The inner end of the hub is provided with a fixed flange 15 having a flat annular surface 16.

17 indicates a flange member which is mounted on the hub to rotate therewith but arranged to be moved axially thereof toward and away from the flange 15 to adjust the clutch. The flange member 17 is provided with a central annular collar 18 which engages the exterior wall of the hub, and 19 indicates one of a plurality of keys spaced about the hub and held in seats 20 cut in the exterior surface of the hub. These keys engage longitudinal keyways 21 cut in the bore of the collar 18. The degree of adjustment of the flange member 17 toward the flange 15 is limited by the annular shoulder 22 formed on the hub.

The radial wall portion of the member 17 is provided with a concentric dished portion 23 extending toward the flange 15, for a purpose to be described, and radial ribs 24 are provided to strengthen the flange member.

The outer end of the hub 14 is exteriorly threaded to receive the ring nut 25 which limits the outward movement of the flange member. The nut is prevented from accidental rotation by means of an angular keeper 26 which is bolted to the flange member 17 and engages a longitudinal slot 27 cut in the outer wall of the nut 25.

28 indicates an annular driving plate concentrically mounted on the hub 14 and held to rotate therewith by means of splines 29 formed in the wall of its bore which engage longitudinal spline ways 30 cut in the outer surface of the hub. Thus the plate 28 is slidable axially of the hub.

31 and 32 indicate two spaced apart concentric walls which are provided with circumferential corrugations so that the walls may be extended or retracted.

The walls may be made of sheet metal, rubber, rubber and steel wire, rubber and fabric, or other suitable material having an elastic characteristic to be axially expanded by fluid pressure while tensioned to retract axially when the pressure is relieved.

At one end, the walls 31 and 32 are attached to the driving plate 28 by the bolts 34, and at the other end, the walls are likewise attached to the inner face of the flange member 17 by the bolts 33. The joints between the metal walls and the flange member 17 and driving plate 28 are sealed as, for instance, with compressible gaskets to prevent escape of fluid pressure. One of the bolts 33 is used to secure the keeper 26.

The dished wall portion 23 of the flange member 17 protrudes into the annular chamber 35 enclosed by flange member 17, the driving plate 28, and the corrugated concentric walls 31 and 32. Thus when fluid pressure is introduced into the chamber 35, the walls 31 and 32 are elongated and move the driving plate 28 longitudinally of the hub 14 and retract as the pressure is relieved to move the driving plate toward the flange member 17.

36 indicates a second driving plate splined to the hub in like manner as driving plate 28, and it is disposed between the fixed flange 15 and the driving plate 28.

Interposed between the driving plates 28 and 36 is a driven ring 37, and between the driving plate 36 and the flange 15 a second driven ring 38 is interposed, both driven rings being free of engagement with the hub, so as to be movable axially of the hub.

The axial bores of the rings 37 and 38 are of sufficient diameter to avoid contact with the hub.

Both surfaces of the rings 37 and 38 are provided with suitable renewable clutch facing material 39. The perimetral edges of the rings 37 and 38 are provided with an annular arranged series of driving lugs 40 which engage slots 41 cut in the bore of the ring member 42 which is disposed concentric with the hub but supported independently thereof. The ring member 42 is operatively connected to the mechanism which is to be driven by the shaft 11 when the clutch mechanism is engaged.

Fluid pressure, such as compressed air, is supplied to the pressure chamber 35 by means of a compressed air conduit 43 which is connected by a rotary joint 44 to the outer end of an axial passage 45 cut in the end portion 12 of the shaft 11 and communicating at its inner end with a radial port 46 cut in the shaft. The outer end of the port 46 has screwed therein the end of a pipe fitting 47 which extends with a loose fit through a hole 48 cut in the wall of the nut 25 and to the outer end of which is connected the curved pipe 49 the other end of which is connected to the port 50 in the dished wall 23 of the flange member 17.

The conduit 43 is connected to a suitable supply of fluid pressure, such as compressed air. 51 indicates a three-way control valve, interposed in the conduit 43 and provided with an exhaust or relief port 52. By the proper manipulation of the valve, fluid pressure may be introduced to the degree desired into the chamber 35, thus extending the corrugated walls 31 and 32, and forcing the driving plate 28 in the direction of the flange 15, causing the inner surface of said plate to come into surface engagement with the driven ring 37, and moving said ring into surface engagement with the driving plate 36 which is in turn moved into surface engagement with the second driven ring 38, which in turn is moved into surface engagement with the face 16 of the flange 15. The two driving plates, the two driven rings and the flange 15 are thus brought into frictional contact with each other, causing the rings 37 and 38 to revolve with the shaft 11 and drive the annulus 42.

When it is desired to release the clutch, the valve 51 is thrown to connect the relief port 52 with the chamber 35, and the consequent relief of pressure in the chamber 35 permits the corrugated walls 31 and 32 to contact axially of the chamber 35, thus releasing the driving plates and the flange 15 from frictional contact with the driven rings and disengaging the clutch.

It is obvious that but one driving plate and one driven ring may be used, or a plurality of driving plates with a driven ring interposed between each pair of driving plates and between the innermost driving plate and driven ring, without departing from the principles of my invention, and depending on the burden to be driven through the clutch.

The purpose of providing the flange member 17 with an inwardly dished wall is to reduce the capacity of the pressure chamber 35, so that the volume of fluid required for operating the clutch is reduced while still providing sufficient clearance for the proper extension and retraction of the corrugated metal walls 31 and 32 in the operation of the clutch.

The clutch may be adjusted, to tighten the clutch, without disassembling its parts, by unlocking the ring nut 25 and screwing the same further onto the hub, simply requiring the removal of the keeper 26, and after adjustment of the nut, replacing the keeper in position to engage another slot 27 (see Fig. 1) in the ring nut which has been brought into registry by the rotation of the latter. The pipe 49 may be flexible hose to permit the necessary rotation of the nut, the hole 48 in the ring nut being elongated circumferentially sufficiently to provide clearance, or additional holes may be provided at spaced intervals in which case the pipe 49 may be made of metal.

The dished radial wall of the flange member 17 provides a cavity to receive the fluid pressure pipe 49 and thus protect it against accidental injury while in service.

Figure 3:
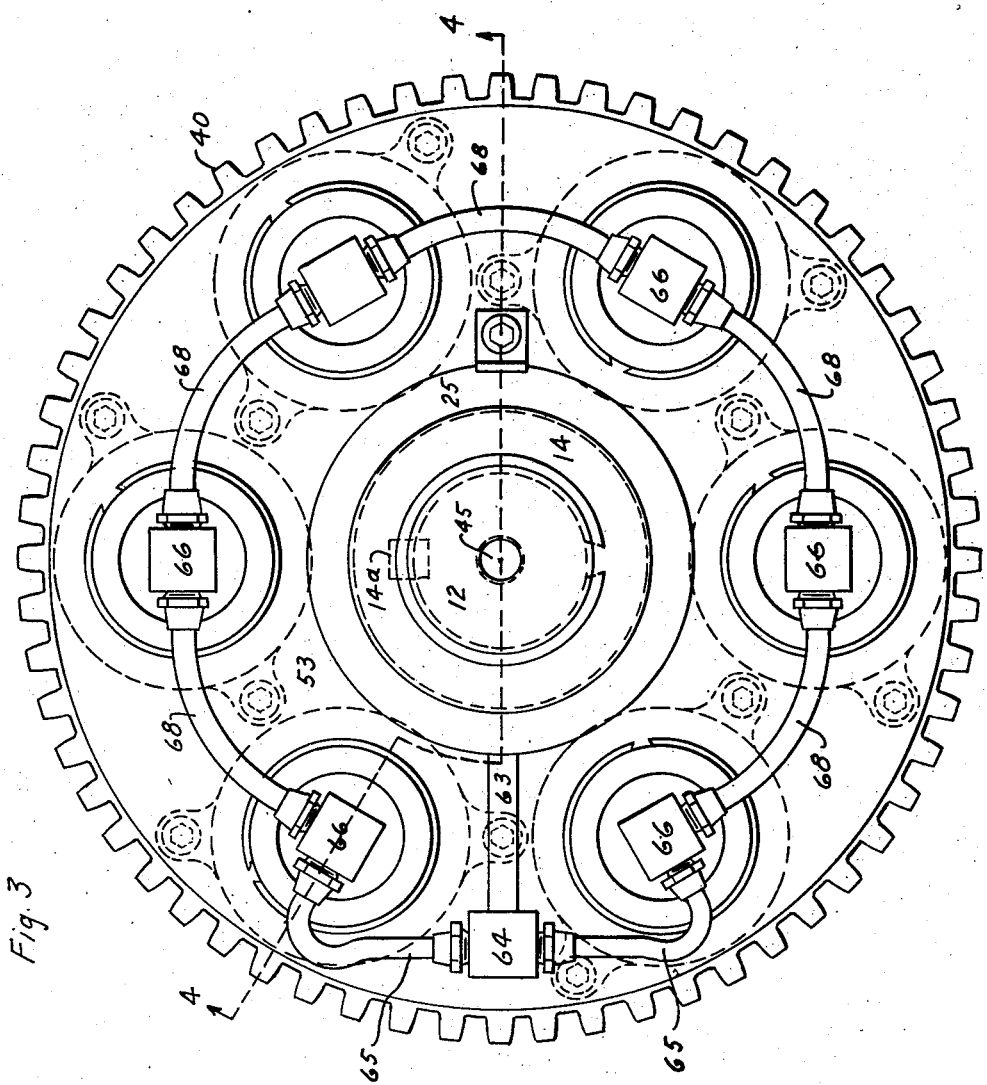
Fig. 3 is an elevation of a modified form of my improved clutch mechanism.

Referring next to Figs. 3 and 4, the modified structure of my improved clutch mechanism being therein illustrated, it is seen that the shaft 12 and the hub 14, the driving plates 28 and 36, and the driven rings 37 and 38 are the same as in the preceding view of the drawings, as are also the main piping and valve connections which supply and control the fluid pressure for operating the clutch.

However in the modified structure, instead of a single fluid pressure chamber, concentric with the hub, I employ a plurality of smaller chambers arranged in annular series, which series is mounted on the hub and arranged concentrically thereto.

Thus, instead of the adjustable flange member 17 shown in Figs. 1 and 2, I provide a flange member 53, adjustably mounted on the hub 14 as in Figs. 1 and 2, but provided with an annular concentric series of circular apertures 54 extending through the flange member and forming sockets in which are mounted the dished plates or cups 55 provided with circumferential ribs 56 to limit their upward insertion through the sockets, and spring snap rings 57 engaging grooves cut circumferentially in the walls of the cups and bearing against the upper surfaces of the flange member to prevent accidental movement of the cups relative to the sockets. By removing the snap ring the cup 55 may be dismounted for repairs or replacement.

58 indicates one of the annular circumferentially corrugated walls, formed of the same or similar material to that of the walls 31 and 32 shown in Figs. 1 and 2, one extremity of the wall 58 bearing against and attached to the circumferential flange 59 of the cup 55, which flange is adjacent the rib 56. The wall 58 is sealed to the flange to prevent the escape of pressure. The other end of the annular wall 58 is closed by an integral head 60. Thus the cup 55 and the annular wall 58 and head 60 form a pressure chamber 61 which is elongated by the introduction of fluid pressure therein and which shortens to its normal length when such pressure is relieved or sufficiently reduced.

The internal capacity of the chamber 61 is reduced by the protrusion therein of the inwardly dished body of the cup 55, thus requiring less pressure fluid to operate the same.

63 indicates a pipe leading from the duct 46 in the shaft 12 and through the hole 48 in the nut 25 to a fitting 64 from the opposite sides of which fitting extend fluid pressure pipes 65 which connect to fittings 66 supported by and connected to the upper ends of vertical pipes 67 whose lower ends are screwed into threaded ports in the centers of the cups 55 which are adjacent to the position of the fitting 64. Additional connecting pipes 68 connect the said fittings 64 with like fittings 66 and pipes 67 provided for the remaining cups 55 in the annular series so that fluid pressure may be supplied, as desired, to all the pressure chambers 61.

It is evident that by turning the valve 51 into the proper position, fluid pressure may be admitted simultaneously to all the pressure chambers 61, causing them to elongate, thus bringing the heads 60 thereof to first engage and then move the driving plate 28 longitudinally of the hub, and progressively forcing the driving plates 28 and 36 into surface contact with the driven rings 37 and 38, and the driven ring 38 into surface contact with the flange 15, thereby causing the rotation of the driven plates and with them the ring 42. A relief of the fluid pressure in the chambers 61 results in a retraction of the heads 60 of the pressure chambers 61 and thus releases the clutch.

The modified form illustrated in Figs. 3 and 4 has certain advantages over the form illustrated in Figs. 1 and 2. Thus the individual pressure chambers may be removed for repairs or replacement with much greater convenience and in less time than required in the case of the single larger chamber. Again, to withstand the same degree of fluid pressure thinner material is required in the case of the multiple pressure chamber type than in the single chamber type, and thus economy in manufacture is realized.

I claim:

1. In a clutch structure for transmitting rotary motion from a source of power comprising a rotary driving shaft, the combination of a hub arranged to be mounted on the shaft and to rotate therewith, a radial flange mounted on and rotating with the hub, at least one chamber having a circular wall of circumferentially corrugated material attached at one end with a sealed joint to the flange, the other end of the wall being enclosed to complete the chamber, the material of said wall having an elastic characteristic to expand longitudinally as fluid pressure is introduced into the chamber and tensioned to retract as such pressure is relieved, an annular driving plate mounted on the hub to rotate therewith but slidable longitudinally thereof, a driven ring loosely mounted on the hub and arranged to be operatively connected to the mechanism to be driven, and means to introduce fluid under pressure into the chamber to expand the same longitudinally to force the driving plate into frictional engagement with the driven ring to rotate the same, and to relieve such pressure and interrupt such frictional engagement.

2. The structure of claim 1 characterized by the provision of means for adjusting the flange longitudinally of the hub to regulate operation of the clutch.

3. In a clutch structure for transmitting rotary motion from a source of power comprising a driving shaft, the combination of a hub arranged to be mounted on the shaft and to rotate therewith, a radial flange fixed to the hub, a second radial flange mounted on the hub and rotating therewith, at least one chamber having a circular wall of circumferentially corrugated material attached at one end with a sealed joint to the second mentioned flange, the other end of the wall being closed to complete the chamber, said wall being formed of material having an elastic characteristic to expand longitudinally as fluid pressure is introduced into the chamber and tensioned to retract as such pressure is relieved, a plurality of annular driving plates mounted on the hub to rotate therewith and slidable longitudinally thereof, said plates being intermediate of the chamber and the first mentioned flange, a plurality of driven rings loosely mounted on the shaft and slidable longitudinally thereof, the driven rings being interposed between the driving plates and between the first mentioned flange and the adjacent driving plate, said driven rings being arranged for operative connection with the mechanism to be driven, and means for introducing fluid pressure into the chamber to elongate the walls of the same and causing the driving plates, the driven rings and the first mentioned flange to be forced into frictional engagement and rotate the driven rings, and to relieve such pressure to interrupt such frictional engagement.

4. The structure of claim 3 characterized by the provision of means for adjusting the second mentioned flange longitudinally of the hub to regulate the operation of the clutch.

5. In a clutch structure for transmitting rotary motion from a source of power comprising a rotary driving shaft, the combination of a hub arranged to be mounted on the shaft and to rotate therewith, a radial flange mounted on the hub and rotating therewith, a driving plate mounted on the hub and to rotate therewith and slidable thereon, a plurality of fluid pressure chambers carried by the flange and extending in the direction of the driving plate, the pressure chambers being arranged in annular series concentric with the hub and formed of circular walls, the material of which is circumferentially corrugated, one end of said walls being attached with a sealed joint to the flange while the other end is closed to complete the chambers, the material of the walls having an elastic characteristic to expand longitudinally as fluid pressure is introduced into the chambers and to retract as such fluid pressure is relieved, a driven ring loosely mounted on the shaft on the side of the driving ring opposite the chambers, said driven ring being arranged for operative connection with the mechanism to be driven, and means to introduce fluid pressure into the chambers to elongate their walls and force the driving plate and the driven ring into frictional engagement to rotate the ring, and to relieve such fluid pressure to interrupt such frictional engagement.

6. The structure of claim 5 characterized by the provision of means to adjust the flange longitudinally of the hub to regulate the operation of the clutch.

7. In a clutch structure for transmitting rotary motion from a source of power comprising a rotary driving shaft, the combination of a hub arranged to be mounted on the shaft and rotate therewith, a radial flange fixed to the hub, a second radial flange mounted on the hub and rotating therewith, a plurality of fluid pressure chambers carried by the second mentioned flange and extending in the direction of the first mentioned flange, the pressure chambers being arranged in annular series concentric with the hub and formed of circular walls, the material of which is circumferentially corrugated, one end of said walls being attached with sealed joints to the second mentioned flange and the other end provided with a closure to complete the chambers, the material of the walls having an elastic characteristic to expand longitudinally as fluid pressure is introduced into the chamber and to retract as such fluid pressure is relieved, a plurality of annular driving plates mounted on the hub between the flanges and slidable longitudinally of the hub, a plurality of annular driven rings loose on the hub and interposed between the driving plates and between the first mentioned flange and the adjacent driving plate, and means for introducing fluid pressure into the chambers to elongate the walls thereof and force the driving plates, the driven rings and the first mentioned flange into frictional engagement and rotate the rings, and to relieve such fluid pressure to interrupt such frictional engagement.

8. The structure of claim 7 characterized by the provision of means to adjust the second mentioned flange longitudinally of the hub to regulate the operation of the clutch.

LELAND O. McLEAN.